(No Model.)

A. K. ROBERSON.
Axes.

No. 228,681. Patented June 8, 1880.

WITNESSES
F. L. Durand
J. J. McCarthy

INVENTOR
By A. K. Roberson
Alexander Mason
ATTORNEY

UNITED STATES PATENT OFFICE.

ADAM K. ROBERSON, OF RED CLOUD, INDIANA.

AX.

SPECIFICATION forming part of Letters Patent No. 228,681, dated June 8, 1880.

Application filed April 16, 1880. (No model.)

*To all whom it may concern:*

Be it known that I, ADAM K. ROBERSON, of Red Cloud, in the county of Knox, and in the State of Indiana, have invented certain new and useful Improvements in Axes; and I do hereby declare that the following is a full, clear, and exact description thereof, reference being had to the accompanying drawings, and to the letters of reference marked thereon, making a part of this specification.

The nature of my invention consists in the construction and arrangement of an ax, having for its object to firmly secure the handle, and yet easily remove the same when desired, as will be hereinafter more fully set forth.

In order to enable others skilled in the art to which my invention appertains to make and use the same, I will now proceed to describe its construction and operation, referring to the annexed drawings, in which—

Figure 1:
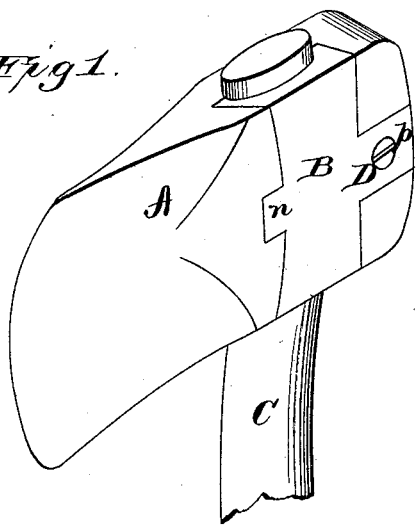
Figure 2:
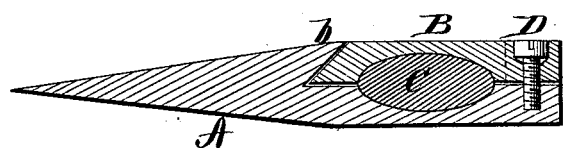
Figure 3:
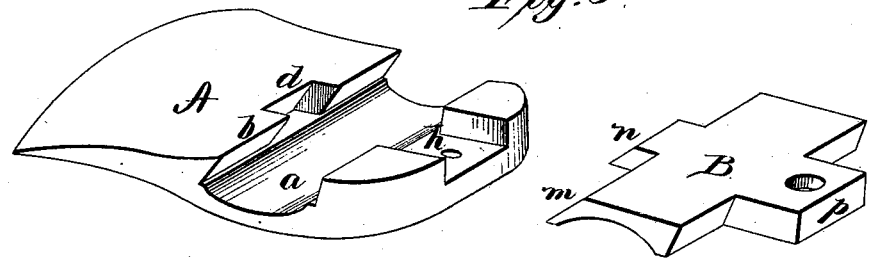

Figure 1 is a perspective view of an ax embodying my invention. Fig. 2 is a longitudinal section of the same. Fig. 3 is a detailed view thereof.

My ax is made in two parts, A and B, as shown, the part A constituting the head and blade, with a concave recess at $a$ to receive the handle C. At one side of the recess $a$ the head is beveled under, as shown at $b$, and in the center is also a beveled notch or recess, $d$. On the opposite side of the main recess $a$ there is a square recess, $h$.

The part B of the ax consists simply of a plate to fit into the main part A and clamp the handle C after being placed in the recess $a$. This plate B has a beveled edge, $m$, and beveled projection $n$, to correspond with the parts $b\ d$ of the head, and has also a projection, $p$, to fit in the recess $h$. A single screw, D, is then passed through said projection $p$, and screwed into the head, whereby the handle becomes securely clamped and held. By simply loosening the screw D, without entirely removing the same or removing the plate B, the handle can easily be taken out when desired.

Having thus fully described my invention, what I claim as new, and desire to secure by Letters Patent, is—

In an ax, the head A, formed with the recesses $a\ d\ h$ and beveled shoulder $b$, the plate B, formed with beveled shoulder $m$ and projections $n\ p$, and the screw D, all constructed and combined, substantially as and for the purposes herein set forth.

In testimony that I claim the foregoing I have hereunto set my hand this 3d day of April, 1880.

ADAM K. ROBERSON.

Witnesses:
 H. AUBREY TOULMIN,
 JOSHUA S. SISSON.